United States Patent [19]
Mizukami et al.

[11] Patent Number: 5,936,794
[45] Date of Patent: Aug. 10, 1999

[54] MEDIA LIBRARY SYSTEM USING MEDIA MANAGEMENT SCHEME FOR REDUCING RECORDING MEDIUM ACCESS TIME

[75] Inventors: Makoto Mizukami; Nobuyoshi Izawa, both of Tokyo; Kikuji Katoh, Saitamaken; Yoshihiro Isomura; Yoshihiro Sako, both of Kanagawaken, all of Japan

[73] Assignee: Nippon Telegraph & Telephone Corp., Tokyo, Japan

[21] Appl. No.: 08/543,996

[22] Filed: Oct. 17, 1995

[30] Foreign Application Priority Data

Oct. 17, 1994 [JP] Japan ................................ P6-250919

[51] Int. Cl.$^6$ ........................... G11B 17/22; G11B 15/68
[52] U.S. Cl. ................................................ 360/92; 369/34
[58] Field of Search .................................. 369/34, 47–48, 369/58, 36, 30; 360/92, 191, 178

[56] References Cited

U.S. PATENT DOCUMENTS

| | | | |
|---|---|---|---|
| 4,912,575 | 3/1990 | Shiosaki | 369/34 |
| 4,945,428 | 7/1990 | Waldo | 360/92 |
| 4,987,533 | 1/1991 | Clark et al. | 369/36 |
| 5,121,483 | 6/1992 | Monahan et al. | 369/34 |
| 5,195,066 | 3/1993 | Amemiya et al. | 369/34 |
| 5,235,572 | 8/1993 | Tamai | 369/30 |
| 5,287,459 | 2/1994 | Gniewek | 369/34 |
| 5,303,214 | 4/1994 | Kulakowski et al. | 369/34 |
| 5,459,848 | 10/1995 | Mase | 369/34 |
| 5,467,326 | 11/1995 | Miyashita et al. | 369/34 |
| 5,568,455 | 10/1996 | Balsom | 369/30 |
| 5,598,385 | 1/1997 | Mizukami et al. | 369/36 |
| 5,652,741 | 7/1997 | Takagi | 369/32 |

FOREIGN PATENT DOCUMENTS 01-173472  7/1989  Japan .

OTHER PUBLICATIONS

Abstract of Article entitled, "Media Management Using Floating Address Algorithm and Its Performance", authored by Mizukami, Iwatsu and Izawa (1994).

Abstract of Article entitled "Mode Selection of Disk Drives for Floating Address Library", authoried by Mizukami, Iwatsu and Izawa (1995).

Abstract of Article entitled, "Media Management Using Floating Address Algorithm for Image and Video Serves", authored by Mizukami, Iwatsu and Izawa (Mar. 1995).

*Primary Examiner*—Brian E. Miller
*Attorney, Agent, or Firm*—Banner & Witcoff, Ltd.

[57] ABSTRACT

A media library system capable of carrying out an access to each recording medium in very short time. A media exchange operation is controlled such that the storage cells of the storehouse are divided into at least two groups arranged in an order of average distances with respect to the media drive, including a first group with a shortest average distance with respect to the media drive, and when the previously used recording medium was mounted on the media drive from the first group, the previously used recording medium is stored in the first group, whereas when the previously used recording medium was mounted on the media drive from one group other than the first group, one recording medium with a lowest utilization frequency among an adjacent group of that one group having a shorter average distance with respect to the media drive than that one group is moved from that adjacent group to that one group and then the previously used recording medium is stored in that adjacent group.

6 Claims, 6 Drawing Sheets

MEDIA LIBRARY SYSTEM USING MEDIA MANAGEMENT SCHEME FOR REDUCING RECORDING MEDIUM ACCESS TIME

BACKGROUND OF THE INVENTION

1. Field of the Invention

The present invention relates to a media library system having a storehouse for storing a large number of recording media such as optical disks, magnetic disks, magnetic tapes, etc., which carries out the exchange of the recording media and the data access to the recording media automatically.

2. Description of the Background Art

The optical disk device is a storage device for exchangeably storing optical disk media, where each optical disk medium is either a type of 90 mm diameter having several hundred MB recording capacity or a type of 130 mm diameter having approximately 1 GB recording capacity, such that unlimited amount of recording capacity can be realized in principle by the exchange of the optical disk media.

In recent years, there has been a development of an optical disk library system which realizes the recording capacity of 1 TB level by carrying out the exchange of the optical disk media automatically, by taking an advantage of such an optical disk device. This optical disk library system has a schematic configuration as shown in FIG. 1, in which a standard type cartridge 1 containing one optical disk medium is mounted onto a disk drive 2 to carry out data read/write with respect to the optical disk medium contained in the cartridge 1, and an arbitrary cartridge 1 stored in a storage cell 3a of a storehouse 3 can be exchanged with the cartridge 1 in the disk drive 2 by being conveyed by a robotic hand 4 of an automatic disk handling mechanism.

Normally, in a case of exchanging the cartridges 1, as shown in FIG. 1, the cartridge 1 taken out from the disk drive 2 is conveyed over to the prescribed storage cell 3a of the storehouse 3 by the robotic hand 4 as indicated by an arrow ①, and then the robotic hand 4 is moved over to the storage cell 3a of a next cartridge 1 as indicated by an arrow ②, and finally this next cartridge 1 is conveyed over to the disk drive 2 as indicated by an arrow ③.

Consequently, in order to improve the access performance in this optical disk library system, it is important to shorten a distance between the disk drive 2 and the storage cell 3a of the storehouse 3, and it is preferable to position the cartridges 1 containing the optical disk media with high utilization frequencies nearby the disk drive 2.

However, in the conventional optical disk library system of FIG. 1, a storing position of each cartridge 1 is fixedly set at a time of installing each cartridge 1 on the optical disk library system, so that when the cartridge 1 containing the optical disk medium with a high utilization frequency is stored at a position distanced from the disk drive 2, a long access time is required every time the exchange of the cartridges 1 is carried out with respect to that optical disk medium, and this in turn can lead to the lowering of the overall access performance of the optical disk library system.

SUMMARY OF THE INVENTION

It is therefore an object of the present invention to provide a media library system capable of carrying out an access to each recording medium in very short time.

According to one aspect of the present invention there is provided a media library system, comprising: a storehouse having a plurality of storage cells for storing a plurality of recording media; media driving means for executing data read/write operation with respect to the recording media; media carrying means for carrying the recording media between the storehouse and the media driving means, so as to exchange a previously used recording medium mounted on the media driving means with a new recording medium stored in the storehouse; and control means for controlling a media exchange operation of the media carrying means to exchange the previously used recording medium with the new recording medium such that the storage cells of the storehouse are divided into at least two groups arranged in an order of average distances with respect to the media driving means, including a first group with a shortest average distance with respect to the media driving means among said at least two groups, and when the previously used recording medium was mounted on the media driving means from the first group, the previously used recording medium is stored in the first group, whereas when the previously used recording medium was mounted on the media driving means from one group other than the first group, one recording medium with a lowest utilization frequency among an adjacent group of said one group having a shorter average distance with respect to the media driving means than said one group is moved from said adjacent group to said one group and then the previously used recording medium is stored in said adjacent group.

According to another aspect of the present invention there is provided a method for controlling a media library system including a storehouse having a plurality of storage cells for storing a plurality of recording media, media driving means for executing data read/write operation with respect to the recording media, and media carrying means for carrying the recording media between the storehouse and the media driving means, the method comprising the steps of; driving the media carrying means to execute a media exchange operation to exchange a previously used recording medium mounted on the media driving means with a new recording medium stored in the storehouse; and controlling a media exchange operation of the media carrying means such that the storage cells of the storehouse are divided into at least two groups arranged in an order of average distances with respect to the media driving means, including a first group with a shortest average distance with respect to the media driving means among said at least two groups, and when the previously used recording medium was mounted on the media driving means from the first group, the previously used recording medium is stored in the first group, whereas when the previously used recording medium was mounted on the media driving means from one group other than the first group, one recording medium with a lowest utilization frequency among an adjacent group of said one group having a shorter average distance with respect to the media driving means than said one group is moved from said adjacent group to said one group and then the previously used recording medium is stored in said adjacent group.

Other features and advantages of the present invention will become apparent from the following description taken in conjunction with the accompanying drawings.

DETAILED DESCRIPTION OF THE PREFERRED EMBODIMENTS

Referring now to FIG. 2 to FIG. 6, one embodiment of a media library system according to the present invention will be described in detail.

Figure 2:
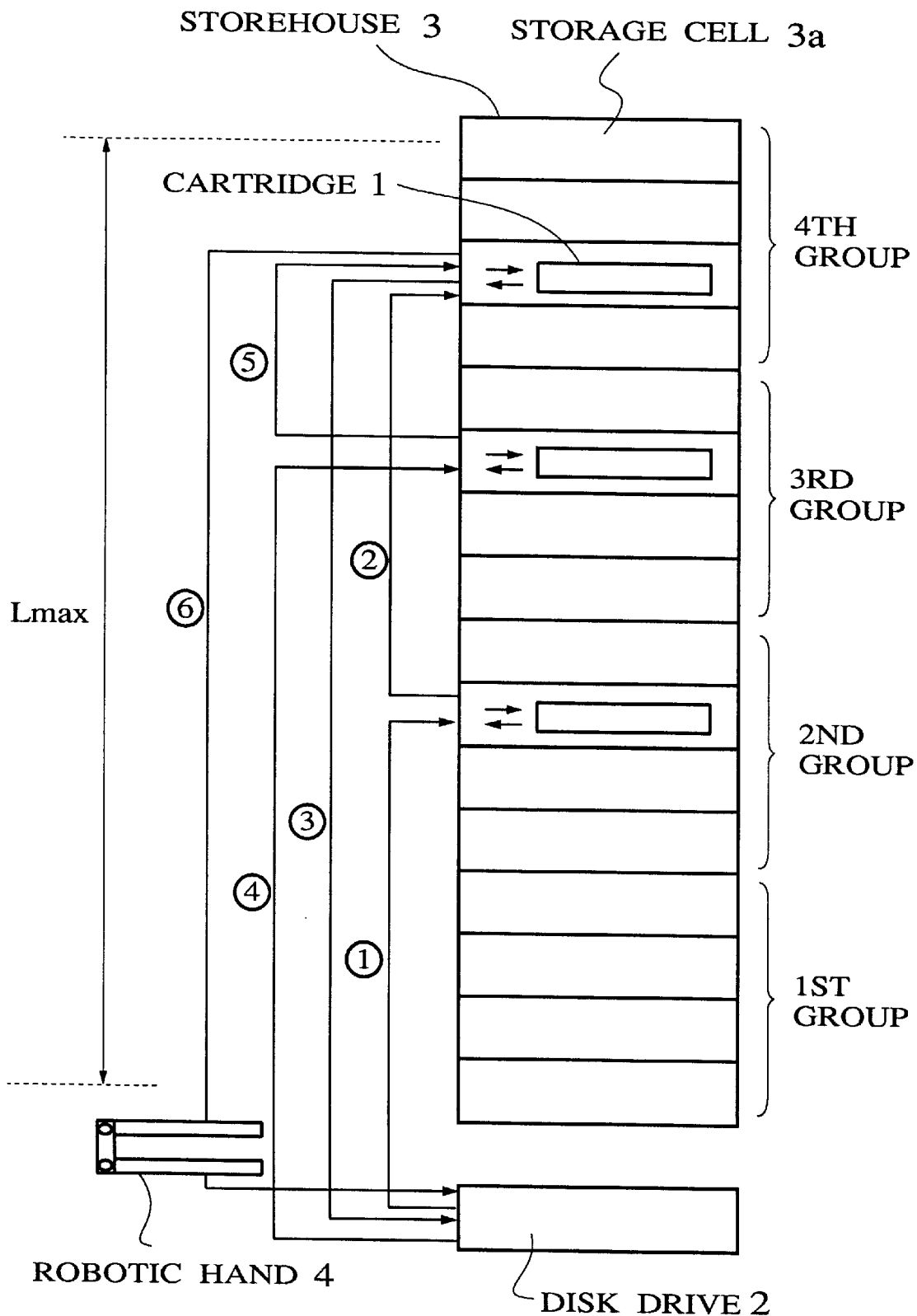
FIG. 2 is a diagram of a schematic configuration of one embodiment of a media library system according to the present invention.

In this embodiment, the system has a schematic configuration as shown in FIG. 2 which comprises a storehouse 3 having a plurality of storage cells 3a for storing a plurality of cartridges 1, a disk drive 2 for driving a disk contained in each cartridge 1, a robotic hand 4 for carrying the cartridge 1 among the disk drive 2 and the storage cells 3a of the storehouse 3, a hand driving mechanism (not shown) for driving the robotic hand 4, and an access controller (not shown) for controlling the hand driving mechanism according to the media management scheme characteristic of the present invention as will be described below.

The cartridge 1 contains an optical disk as a recording medium, and the access to the data recorded on the optical disk becomes possible as the cartridge 1 is mounted on the disk drive 2.

The disk drive 2 is formed by an optical disk drive device positioned below the storehouse 3, which carries out the data read/write operations with respect to the recording medium contained in the cartridge 1 mounted thereon.

The storehouse 3 has a plurality of storage cells 3a arranged along a vertical direction, where each storage cell 3a can store any one of the cartridges 1. Here, as indicated in FIG. 2, the storage cells 3a of the storehouse 3 are managed in at least two groups (four groups G1, G2, G3, and G4 in this embodiment) along a vertical direction, which are arranged in an order of proximity to the disk drive 2. Thus, in this embodiment, the first group G1 is a group of the storage cells 3a for which an average carrying distance to the disk drive 2 is shortest, the second group G2 is a group of the storage cells 3a for which an average carrying distance to the disk drive 2 is second shortest, the third group G3 is a group of the storage cells 3a for which an average carrying distance to the disk drive 2 is second longest, and the fourth group G4 is a group of the storage cells 3a for which an average carrying distance to the disk drive 2 is longest.

The robotic hand 4 is driven by the hand driving mechanism and the access controller to move among the disk drive 2 and the storage cells 3a of the storehouse 3 so as to carry the cartridges 1 among the disk drive 2 and the storage cells 3a of the storehouse 3.

Figure 3:
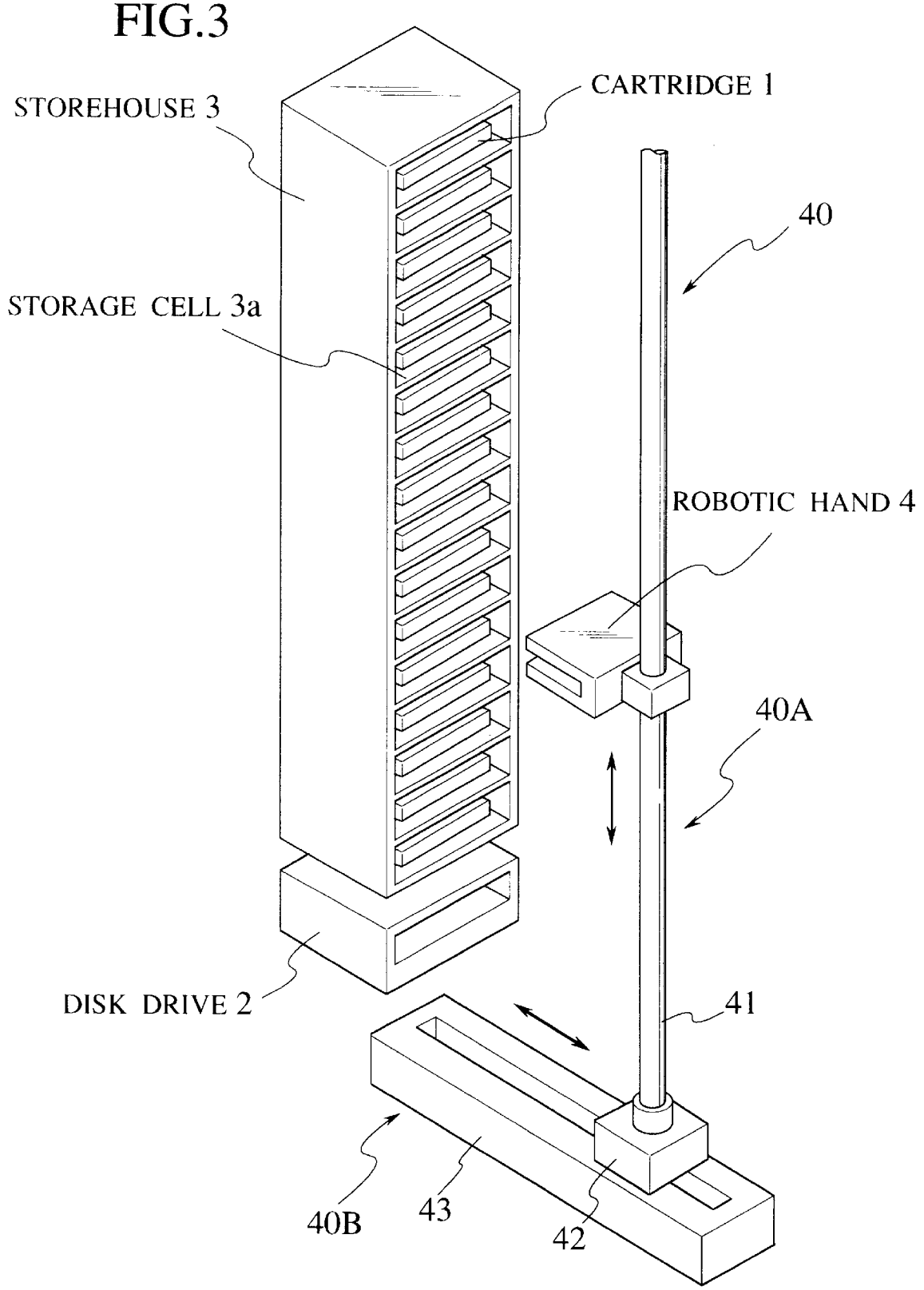
FIG. 3 is a perspective view of one exemplary physical configuration of a media library system according to the present invention.

Here, a concrete example of the physical configuration of the media library system suitable for this embodiment is shown in FIG. 3.

In this physical configuration of the media library system shown in FIG. 3, the storehouse 3 has a plurality of storage cells 3a arranged one dimensionally along a vertical direction, where each storage cell 3a can store any one of the cartridges 1. The disk drive 2 is located directly below this storehouse 3, and in front of the storehouse 3 and the disk drive 2, the hand driving mechanism 40 is provided.

This hand driving mechanism 40 includes a vertical driving mechanism 40A for moving the robotic hand 4 in the vertical direction, i.e., up or down, and a horizontal driving mechanism 40B for moving the robotic hand 4 in the horizontal direction, i.e., toward or away from the disk drive 2 and the storehouse 3. The vertical driving mechanism 40A has a guide shaft 41 extended in the vertical direction, on which the robotic hand 4 is supported to be movable up and down by means of a motor (not shown) and a gear (not shown) engaged with the guide shaft 41 which are provided within the robotic hand 4. The horizontal driving mechanism 40B has a base member 42 for supporting the guide shaft 41 and a guide member 43 along which the base member 42 is movable by means of a motor (not shown) or a cylinder (not shown) provided within the base member 42 such that the vertical driving mechanism 40A as a whole can be moved toward or away from the disk drive 2 and the storehouse 3.

In this hand driving mechanism 40, the robotic hand 4 can be moved to the position of any desired one of the disk drive 2 and the storage cells 3a of the storehouse 3 by means of the vertical driving mechanism 40A while the vertical driving mechanism 40A as a whole can be moved toward or away from the disk drive 2 and the storehouse 3 so as to take out or store the cartridge 1 with respect to any desired one of the disk drive 2 and the storage cells 3a of the storehouse 3.

It is to be noted that this physical configuration of the hand driving mechanism 40 shown in FIG. 3 is only an example, and can be modified in any suitable manner.

Figure 4:
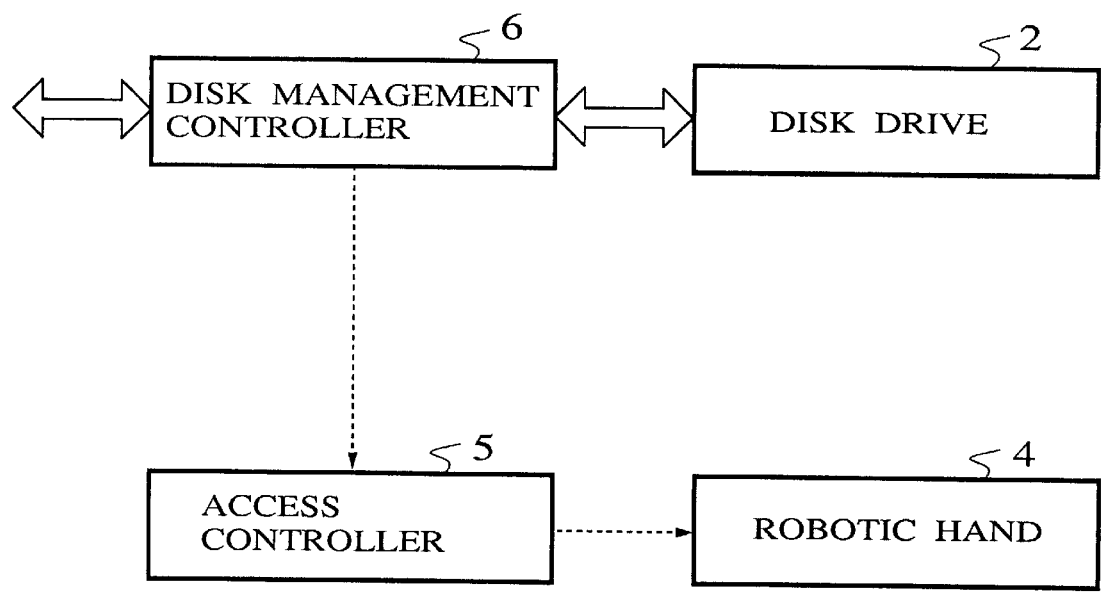
FIG. 4 is a schematic block diagram of a control section for the media library system according to the present invention.

On the other hand, a control section of the media library system in this embodiment has a configuration as shown in FIG. 4, which includes an access controller 5 connected with the robotic hand 4, and a disk management controller 6 connected with the disk drive 2 and the access controller 5. The access controller 5 is formed by a microcomputer, etc., and controls the operation of the robotic hand 4 according to a program loaded therein. This access controller 5 is in turn controlled by the disk management controller 6 which manages an access frequency of each cartridge 1, i.e., a utilization frequency determined by an elapsed time since the last use of each cartridge 1. More specifically, the disk management controller 6 stores date and time at which the last access request was made and a current position for each cartridge 1, and the utilization frequency is set to be a value which decreases as the elapsed time increases, and which takes the maximum value when the elapsed time is equal to 0.

It is to be noted here that, in the media library system of this type, there are two operation schemes including a scheme which uses a state in which the cartridge 1 is not mounted on the disk drive 2 as a stationary state, and a scheme which uses a state in which the cartridge 1 is mounted on the disk drive 2 as a stationary state. The former scheme is a scheme aiming at a realization of a high speed access performance by minimizing the operation of the robotic hand 4 at a time of the exchange of the cartridge 1 on the disk drive 2, while the latter scheme is a scheme aiming at an improvement of an overall access performance in the media library system by enabling an instantaneous response in a case the access request to the same cartridge 1 occurs consecutively. There is a need to choose one of these two schemes according to a state of use of the media library system, but these two schemes have no difference in terms of the movements and the moving distances of the robotic hand 4. Consequently, in the following description, a case of adopting the latter scheme will be described as it is relatively easier to understand the characteristic features of the present invention in the latter scheme.

Figure 5:
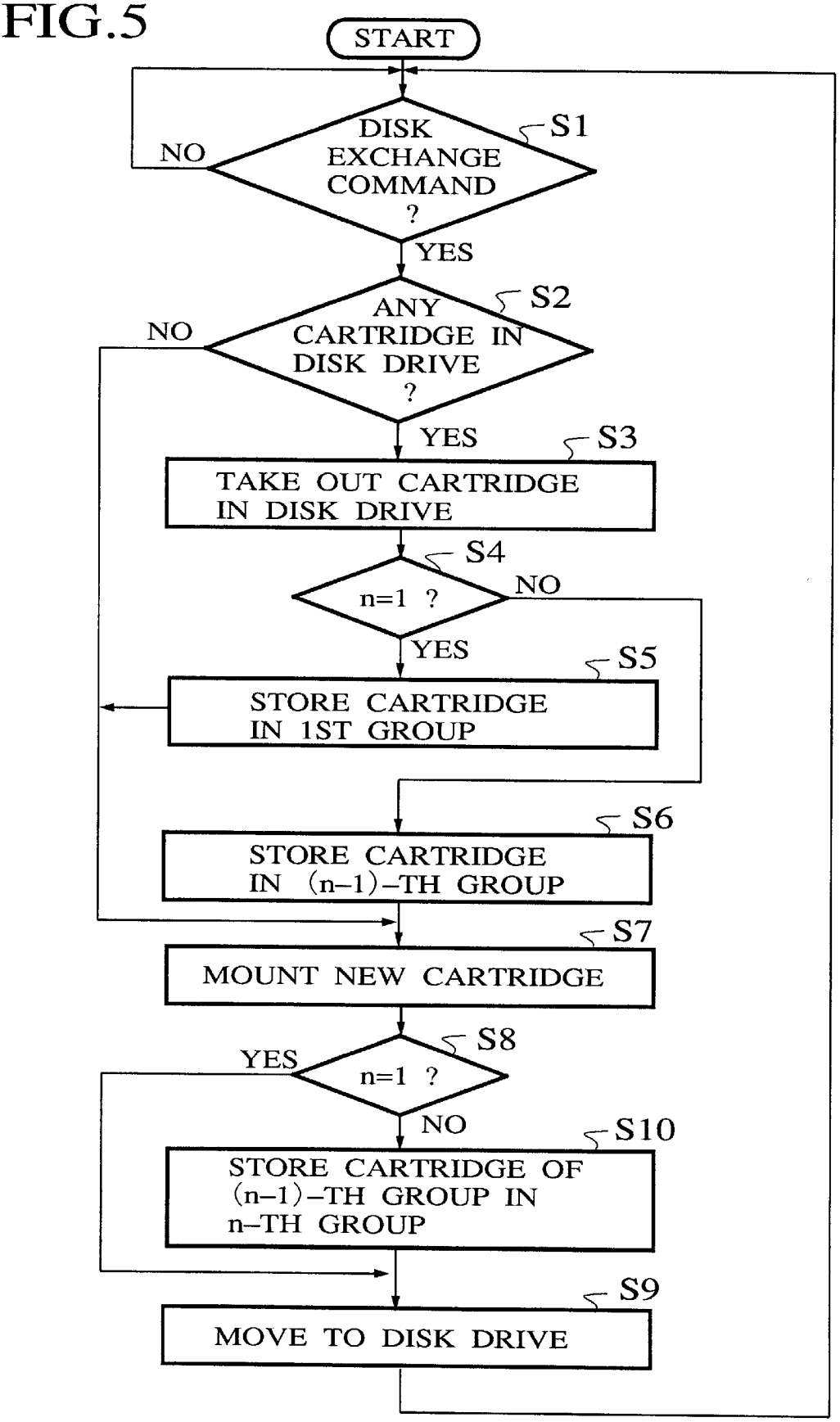
FIG. 5 is a flow chart for a disk exchange operation in the media library system of FIG. 2.

Now, in the media library system of this embodiment, the cartridge 1 mounted on the disk drive 2 is exchanged with another cartridge 1 stored in the storehouse 3 by the operation of the robotic hand 4 as indicated in FIG. 2, according to the flow chart of FIG. 5, as follows. In FIG. 2, the encircled numbers accompanying arrows indicate the orders of the movements of the robotic hand 4. Also, in FIG. 5, a symbol n indicates a group number.

First, whether a disk exchange command is issued or not is judged (step S1), and if so, whether an already accessed cartridge 1 is still mounted on the disk drive 2 or not is Judged (step S2). If this is an already accessed cartridge 1 on the disk drive 2 (step S2 YES), the robotic hand 4 takes out the cartridge 1 currently mounted on the disk drive 2 (step S3) and if this cartridge 1 has originally been stored in the first group G1 (n=1) (step S4 YES), this cartridge 1 is stored into the first group G1 (step S5). On the other hand, if this cartridge has originally been stored in the group other than the first group G1 (n≠1) (step S4 NO), then this cartridge 1 is stored in the (n−1)-th group, i.e., a group with a one step shorter average carrying distance to the disk drive 2 than the originally stored group (step S6).

For instance, when the cartridge 1 has originally been stored in the third group G3 (n=3), this cartridge 1 will be stored into the second group G2 (n=2) (arrow ① in FIG. 2). If there is no cartridge on the disk drive 2 (step S2 NO), these steps S3 to S6 are skipped.

Next, a new cartridge 1 is taken out from an arbitrary storage cell 3a and mounted onto the disk drive 2 (step S7). Then, if this new cartridge 1 has been stored in the first group G1 (n=1) (step S8 YES), the robotic hand 4 is moved to the disk drive 2, and the operation returns to the step S1 for a disk next exchange command. In this case, at a time of the next disk exchange command, the cartridge 1 mounted on the disk drive 2 will be returned to the first group G1. On the other hand, if this new cartridge 1 has been stored in a group other than the first group G1 (n≠1) (step S8 NO), the cartridge 1 with the lowest utilization frequency among the (n−1)-th group with a one step shorter average carrying distance to the disk drive 2 than that originally stored n-th group is taken out and stored into that originally stored n-th group (step S10).

For instance, if the new cartridge 1 that has been stored in the fourth group G4 (n=4) is taken out and mounted on the disk drive 2 (arrows ② and ③ in FIG. 2), the cartridge 1 with the lowest utilization frequency among the third group G3 is taken out and stored into the fourth group G4 (arrows ④ and ⑤ in FIG. 2). Then, the operation proceeds to the step S9 described above (arrow ⑥ in FIG. 2). In this case, the cartridge 1 mounted on the disk drive 2 will be returned to the third group G3 at a time of the next disk exchange command.

Now, the effect of the improvement of the access performance in the media library system of the this embodiment will be explained in comparison to the conventional media library system.

Figure 1:
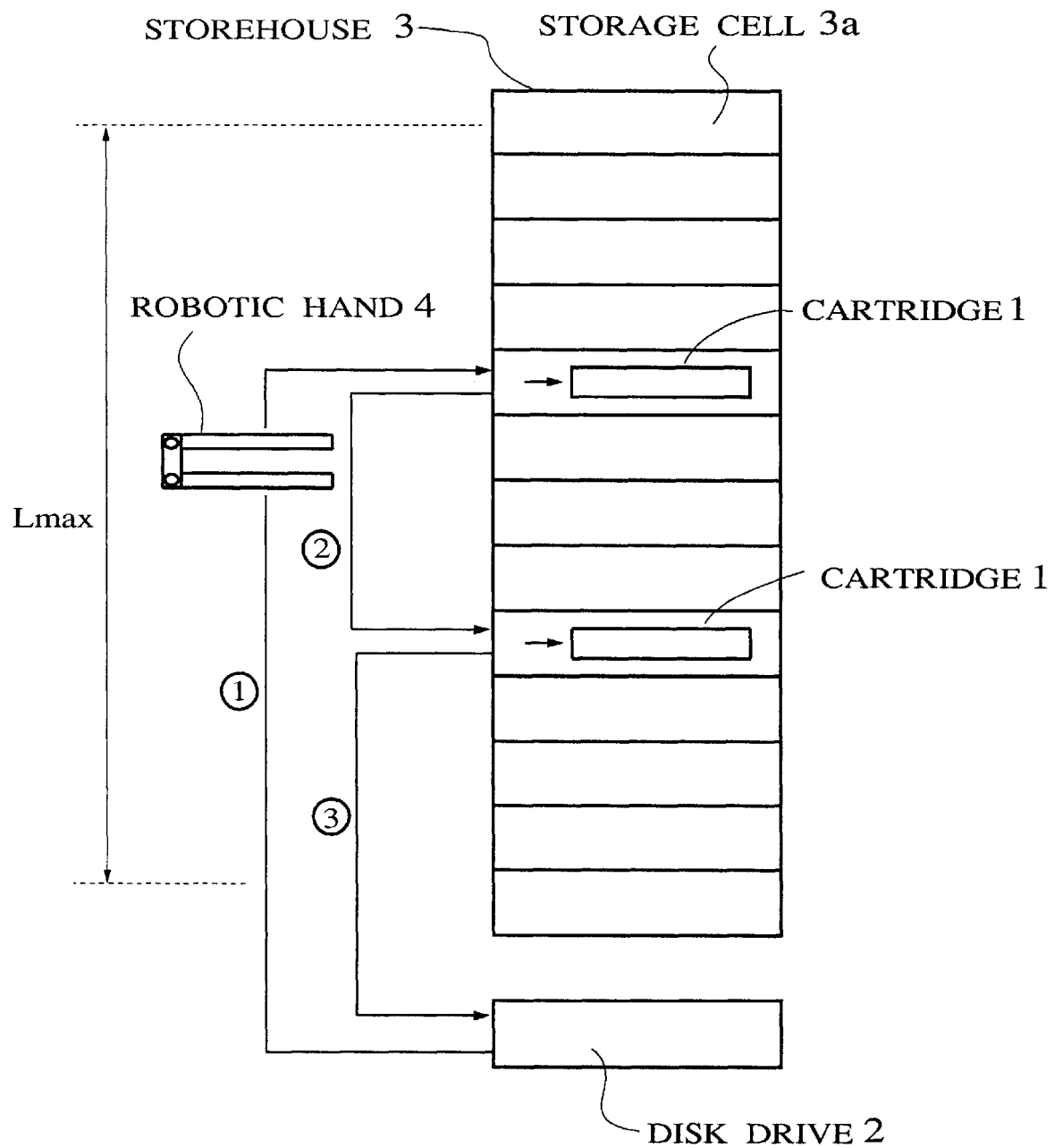
FIG. 1 is a diagram of a schematic configuration of one example of a conventional optical disk library system.

In the conventional media library system as shown in FIG. 1, in a case of making an access to a desired recording medium, the cartridge 1 on the disk drive 2 is carried by the robotic hand 4 to the prescribed storage cell 3a first, and then the robotic hand 4 is moved to the storage cell 3a of the desired cartridge 1, and finally the the desired cartridge 1 is carried by the robotic hand 4 to the disk drive 2. Here, for the sake of simplicity, the shortest access distance from the disk drive 2 to the storehouse 3 is set to be 0 while the longest access distance from the disk drive 2 to the storehouse 3 is set to be Lmax, and it is assumed that the cartridges are accessed at random.

In this case, in a process of returning the cartridge 1 mounted on the disk drive 2 to a prescribed storage cell 3a of the storehouse 3, the prescribed storage cell 3a to which the cartridge 1 is to be returned can be located at any position between both ends of the storehouse 3 at an equal probability, so that the average moving distance of the robotic hand 4 is going to be Lmax/2. Next, in moving from there to the storage cell 3a storing the specified next cartridge 1, the robotic hand 4 is going to move between arbitrary two storage cells 3a on average, so that the average moving distance of the robotic hand 4 for this movement is going to be approximately Lmax/3. Finally, in carrying the specified next cartridge 1 from the storage cell 3a of the storehouse 3 to the disk drive 2, the average moving distance of the robotic hand 4 is going to be the same as that in a process of returning the cartridge 1 from the disk drive 2 to the storehouse 3 on average, so that it is going to be Lmax/2.

Consequently, the average moving distance of the robotic hand 4 required in carrying out the data read/write operation with respect to the recording medium in any desired cartridge 1 is going to be:

$$L\max/2 + L\max/3 + L\max/2 = 4L\max/3 \qquad (1)$$

in the conventional media library system.

On the other hand, in the media library system of this embodiment, the storehouse 3 is divided into four groups (i.e., a total number of groups N=4), and those cartridges with highest access frequencies are placed in the first group G1 closest to the disk drive 2 while those cartridges with lowest access frequencies are placed in the fourth group G4 farthest from the disk drive 2. Here, for the sake of simplicity, the shortest access distance from the disk drive 2 to the storehouse 3 is set to be 0 while the longest access distance from the disk drive 2 to the storehouse 3 is set to be Lmax, an access probability for the n-th group is set to be $\alpha_n$, and it is assumed that the cartridges are accessed at random within each group. In this case, the average moving distance of the robotic hand becomes as follows.

First, in a process of returning the already accessed cartridge 1 mounted on the disk drive 2 to the storehouse 3, if this already accessed cartridge 1 has originally been stored in the n-th group, this cartridge 1 is going to be stored into a vacant storage cell in the (n−1)-th group. Here, it is assumed that a vacant storage cell in the (n−11)-th group has been created by the rearrangement process to be described below. In this case, a probability for this cartridge 1 to be returned to the (n−1)-th group is $\alpha_n$, and an average moving distance for the robotic hand 4 to return this cartridge 1 from the disk drive 2 to the (n−1)-th group is (2n−3)Lmax/2N. On the other hand, if this already accessed cartridge 1 has originally been stored in the first group, this cartridge 1 is going to be stored into a vacant storage cell in the first group. In this case, a probability for this cartridge 1 to be returned to the first group is $\alpha_1$, and an average moving distance for the robotic hand 4 to return this cartridge 1 from the disk drive 2 to the first group is Lmax/2N.

Next, in moving from there to the storage cell 3a storing the desired next cartridge 1, a probability for the robotic hand 4 to move from the m-th group to the n-th group is $\alpha_m$ $\alpha_n$, and an average moving distance for the robotic hand 4 to move from the m-th group to the n-th group is $|m-n|L\max/N$. Here, however, in a case of m=n, the average moving distance of the robotic hand 4 becomes $L\max/3$.

Finally, in carrying the desired next cartridge 1 from the storage cell 3a of the storehouse 3 to the disk drive 2, a probability for the robotic hand 4 to move from the n-th group to the disk drive 2 is $\alpha_n$, and an average moving distance for the robotic hand 4 to move from the n-th group to the disk drive 2 is $(2n-1)L\max/2N$.

Consequently, the average moving distance of the robotic hand 4 required in carrying out the data read/write operation with respect to the recording medium in any desired cartridge 1 can be expressed by the following equation (2).

$$\text{Average moving distance for access} = \alpha_1 L\max/2N + \qquad (2)$$
$$\sum_{n=2}^{N} \alpha_n(2n-3)L\max/2N + \sum_{m=1}^{N}\sum_{n=1(m\neq n)}^{N} \alpha_m\alpha_n|m-n|L\max/N +$$
$$\sum_{n=1(m=n)}^{N} \alpha_n^2 L\max/3N + \sum_{n=1}^{N} \alpha_n(2n-1)L\max/2N$$

Also, as can be seen from FIG. 2, a number of movements of the robotic hand 4 required in this process is 3, which is the same as in the conventional case. That is:

A number of movements=3

Now, when it is assumed that the storehouse 3 is divided into N groups of nearly equal sizes, and the desired cartridge 1 is localized in the first group, i.e., $a_1=1$, the average moving distance of the robotic hand 4 given by the above equation (2) can be expressed as the following equation (3):

$$\text{Average moving distance for access } (\alpha_1=1)=L\max/2N+L\max/3N+L\max/2N=4L\max/3N \qquad (3)$$

so that when the storehouse 3 is divided into four groups (N=4) as in this embodiment, it can be seen that the average moving distance of the robotic hand 4 is shortened to be ⅓ compared with the conventional case given by the above equation (1).

On the other hand, when it is assumed that all the cartridges 1 have the identical utilization frequency. i.e., $a_n=1/N$, which is the worst possible situation for the media library system, the average moving distance of the robotic hand 4 given by the above equation (2) can be expressed as the following equation (4):

$$\text{Average moving distance for access } (\alpha_n = 1/N) = \qquad (4)$$
$$L\max/2N^2 + \sum_{n=2}^{M}(2n-3)L\max/2N^2 + \sum_{m=1}^{N}\sum_{n=1(m\neq n)}^{N} |m-n|$$
$$L\max/N^3 + \sum_{n=1(m=n)}^{N} \alpha_n^2 L\max/3N^2 + \sum_{n=1}^{N}(2n-1)L\max/2N^2$$

so that when the storehouse 3 is divided into four groups (N=4) as in this embodiment, the average moving distance of the robotic hand 4 is going to be $55L\max/48$, which is approximately 24% shorter compared with the conventional case given by the above equation (1). This shortening of the average moving distance of the robotic hand 4 is realized in this embodiment by storing the already accessed cartridge 1 in the (n-1)-th group which is one step closer to the disk drive 2 than the originally stored group, and executing the rearrangement of the cartridges 1 after the carrying of the desired cartridge 1 as will be described below.

After the desired cartridge 1 is mounted on the disk drive 2, while the disk drive 2 is activated to carry out the data read/write operation with respect to this cartridge 1, the rearrangement of the cartridges 1 is carried out within the storehouse 3. This rearrangement of the cartridge 1 secures a vacant storage cell in the (n-1)-th group to which the cartridge 1 taken from the n-th group to the disk drive 2 will be returned after the data read/write operation is finished, by moving the cartridge 1 with the lowest utilization frequency among the cartridges 1 in the (n-1)-th group to a vacant storage cell in the n-th group.

In this case, the robotic hand 4 is moved from the disk drive 2 to the (n-1)-th group first. This is an operation associated with a conveying of the desired cartridge 1 from the n-th group to the disk drive 2, so that a probability for the robotic hand 4 to move from the disk drive 2 to the (n-1)-th group is $\alpha_n$. Also, an average moving distance of the robotic hand 4 for this operation is $(2n-3)L\max/2N$. Here, however, in a case the desired cartridge 1 has been conveyed from the first group, this cartridge 1 is going to be stored into a vacant storage cell in the first group again, so that the rearrangement of the cartridges 1 is unnecessary.

Next, the robotic hand 4 takes out the cartridge 1 with the lowest utilization frequency among the cartridges of the (n-1)-th group, and store this cartridge 1 into a vacant storage cell in the n-th group. In this operation, an average moving distance of the robotic hand 4 is $L\max/N$.

Finally, the robotic hand 4 moves to the disk drive 2 in preparation for the next access. In this operation, an average moving distance for the robotic hand 4 to move to the disk drive 2 is $(2n-1)L\max/2N$.

Consequently, the average moving distance of the robotic hand 4 required in carrying out the rearrangement of the cartridges 1 can be expressed by the following equation (5).

$$\text{Average moving distance for rearrangement} = \qquad (5)$$
$$\sum_{n=2}^{N} \alpha_n((2n-3)L\max/2N + L\max/N + (2n-1)L\max/2N)$$

Also, as can be seen from FIG. 2, a number of movements of the robotic hand 4 required in each rearrangement process is 3, so that an average number of movements for the robotic hand 4 can be expressed by the following equation (6).

$$\text{Average number of movements for rearrangement} = \sum_{n=2}^{N} 3\alpha_n \qquad (6)$$

Here, when it is assumed that the storehouse 3 is divided into N groups of nearly equal sizes, and the desired cartridge 1 is localized in the first group, i.e., $a_1=1$, there is no access for the purpose of the rearrangement of the cartridges 1 for the reason explained above.

On the other hand, when it is assumed that all the cartridges 1 have the identical utilization frequency. i.e., $a_n=1/N$, which is the worst possible situation for the media library system, the average moving distance and the average number of movements of the robotic hand 4 given by the above equations (5) and (6) can be expressed as the following equations (7) and (8):

Average moving distance for rearrangement$(\alpha_n = 1/N) =$ (7)

$$\sum_{n=2}^{N} ((2n-3)L\max/2N^2 + L\max/N^2 + (2n-1)L\max/2N^2)$$

Average number of movements for rearrangement$(\alpha_n = 1/N) =$ (8)

$$3(N-1)/N$$

so that when the storehouse 3 is divided into four groups (N=4) as in this embodiment, the average moving distance of the robotic hand 4 is going to be 15Lmax/16, and the average number of movements of the robotic hand 4 is going to be approximately 2.

It is to be noted that this rearrangement of the cartridges 1 is usually carried out by utilizing the idle time after the completion of the disk exchange, so that it does not affect the average access performance of the media library system.

Thus, according to this embodiment, when the cartridge 1 is used once, a group number with which this cartridge 1 is associated becomes smaller by one as this cartridge 1 is returned to the group which is one step closer to the disk drive 2. Consequently, the cartridges 1 are arranged in an order of their utilization frequencies in the storehouse 3, with the cartridges 1 with the highest utilization frequencies placed in the first group with the shortest average carrying distance, so that the average moving distance of the robotic hand 4 can be shortened.

In addition, the cartridge 1 is moved only for one group part at most, from a certain group to its neighboring group, at a time of each access, so that the movements of the cartridges 1 in a case of arranging the cartridges 1 in an order of their utilization frequencies are automatically weighted according to their past utilization frequencies in effect, and the cartridge 1 with the low past utilization frequency is not going to disturb the arrangement of the cartridges 1 with the higher past utilization frequencies in a rather rare occasion of its use. This fact contributes to the feature of this media library system that the arrangement of the cartridges 1 in the library which is suitable for a normally carried out job is not easily affected by the other job which is carried out by a short time interruption, etc.

In other words, in this embodiment, the recording media are effectively arranged within the storehouse 3 in an order of their access probabilities, where the access probability of each recording medium is determined according to the access frequency which is indicated by an elapsed time since the last access to each recording medium, and the past access frequency which is reflected by the group to which each recording medium belongs.

Figure 6:
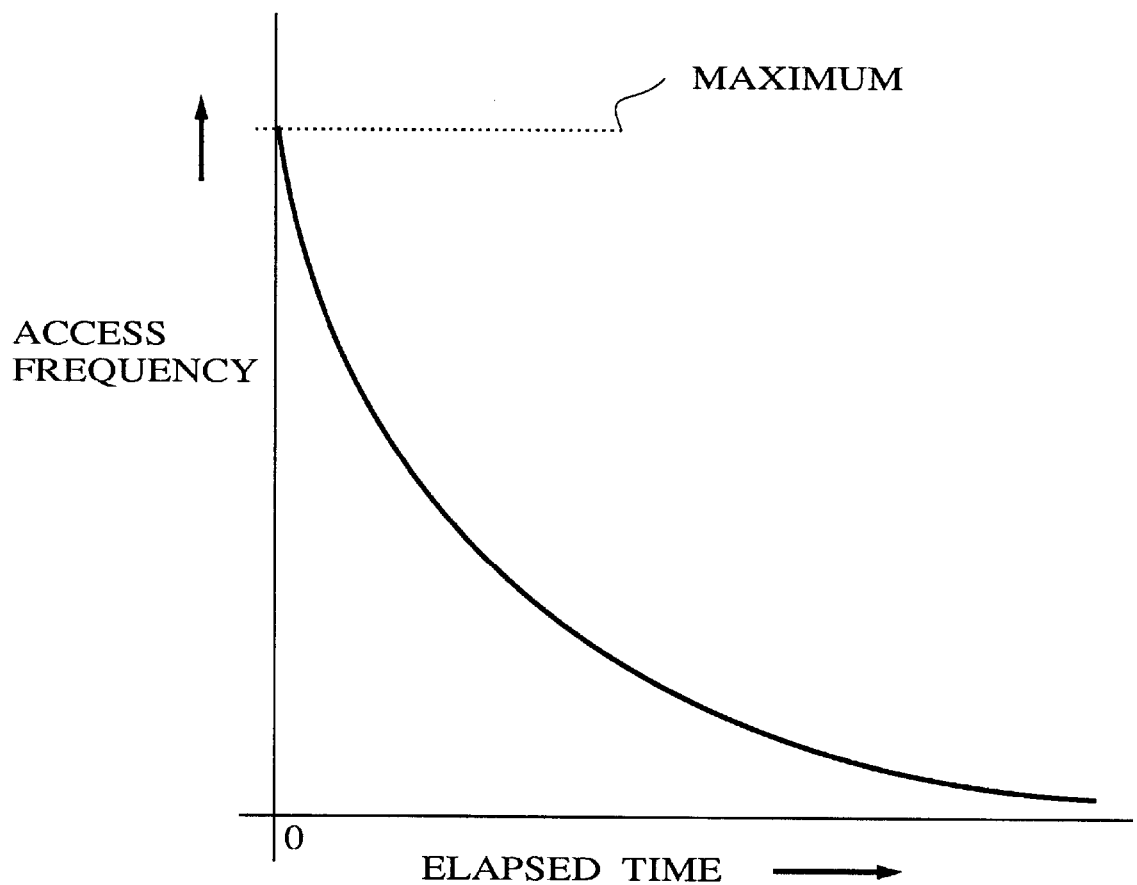
FIG. 6 is a graph of an access frequency as a function of an elapsed time realized in the media library system of FIG. 2.

Moreover, as already mentioned above, in this embodiment, the utilization frequency of each cartridge 1 is set to be a value which decreases as the elapsed time since the last access to each cartridge 1 increases, and which takes the maximum value when the elapsed time is equal to 0, as shown in FIG. 6.

In practice, it suffices to be able to distinguish a higher utilization frequency from a lower utilization frequency, so that a time of the last access is memorized for each cartridge 1, and the memorized last access times of the cartridges 1 are compared to set a cartridge with the later last access time (greater last access time value) as a cartridge with a higher utilization frequency. This utilization frequency calculation scheme has an advantage that a required calculation is extremely simple so that it is suitable for a practical implementation.

On the other hand, in this scheme, a past utilization frequency, i.e., how often each cartridge 1 had been used in the past, is not at all accounted, so that the cartridges 1 which are last accessed at nearly equal times will be regarded as having nearly equal utilization frequencies. However, this fact is effectively compensated in this embodiment, because in the so called floating address scheme in which the storage position of each cartridge 1 is not fixed to a particular storage cell 3a as in this embodiment, the operation of the robotic hand 4 at a time of rearrangement of the cartridges 1 is affected by the past utilization frequency of each cartridge 1 as described above.

Thus, in this embodiment, the calculation and the comparison of the utilization frequencies can be done easily by means of the above described utilization frequency calculation scheme, so as to reduce an operation load due to the utilization frequency calculation, while effectively accounting for the past utilization frequency of each cartridge 1 such that the operation of the floating address scheme can be stabilized with respect to a sporadically occurring job.

Now, in general, the media library system can encounter a very busy situation in which a number of access requests to a plurality of small capacity files recorded in different cartridges 1 occur simultaneously such that the cartridges 1 have to be exchanged incessantly. In such a very busy situation, the rearrangement access for the purpose of returning the cartridge 1 taken from the n-th group to the (n−1)-th group, i.e., an operation to move the cartridge 1 with the lowest utilization frequency in the (n−1)-th group to the n-th group, as incorporated in the media library system of this embodiment described above, can be an obstruction to the quick disk exchange operations required in this very busy situation.

In order to cope with this problem, it is possible to release the floating address scheme temporarily and use the fixed address scheme similar to the conventional case instead whenever a number of waiting access requests reaches to a prescribed number, such that the cartridge 1 taken from the n-th group is returned to the original storage cell 3a in the n-th group again in such a very busy situation. Even when such a temporal switching from the floating address scheme to the fixed address scheme is incorporated, the arrangement of the cartridges 1 in the storehouse 3 will not be affected considerably, because the cartridge 1 is moved only for one group part at most for each access even in the floating access scheme of this embodiment.

It is to be noted here that, even when a plurality of accesses to different cartridges 1 occur simultaneously, if a file capacity of each accessed file is so large that a time required for reading/writing of each file is longer than an average time required for the rearrangement access, or that a sum of a time required for reading/writing of each file and a time required for stopping the operation of the disk drive 2 from a state for carrying out the data read/write operation to a state in which the rotation of the recording medium is stopped and the cartridge 1 can be taken out from the disk drive 2 is longer than an average time required for the rearrangement access, it is still possible to carry out the rearrangement access in a course of the file read/write operations.

By switching the floating address scheme and the fixed address scheme according to the file access state in this manner, it is possible to realize the media library system with a superior total performance, which can maintain the same access performance level as the conventional system using the fixed address scheme even when a number of access to a plurality of small capacity files occur simultaneously.

It is to be noted here that the recording medium other than the optical disk used in this embodiment, such as the magnetic disk or the magnetic tape can be used without affecting the essence of the present invention. Moreover, instead of containing the recording medium within a cartridge 1 as described above, the recording medium may be handled directly, if desired. Furthermore, the storehouse 3 may have the storage cells 3a arranged in the horizontal direction as well as the vertical direction if desired, by modifying the robotic hand 4 to be capable of moving in both vertical and horizontal directions.

It is also to be noted that, besides those already mentioned above, many modifications and variations of the above embodiment may be made without departing from the novel and advantageous features of the present invention. Accordingly, all such modifications and variations are intended to be included within the scope of the appended claims.

What is claimed is:

1. A media library system, comprising:
   a storehouse having a plurality of storage cells for storing a plurality of recording media;
   media driving means for executing data read/write operation with respect to the recording media;
   media carrying means for carrying the recording media between the storehouse and the media driving means, so as to exchange a previously used recording medium mounted on the media driving means with a new recording medium stored in the storehouse; and
   control means for controlling a media exchange operation of the media carrying means to exchange the previously used recording medium with the new recording medium such that the storage cells of the storehouse are divided into at least three groups each group having a plurality of storage cells arranged in an order of average distances with respect to the media driving means, including a first group with a shortest average distance with respect to the media driving means among said at least three groups, a second group with a second shortest average distance with respect to the media driving means among said at least three groups which is arranged next to the first group, and a third group with a third shortest average distance with respect to the media driving means among said at least three groups which is arranged next to the second group, and when the previously used recording medium is mounted on the media driving means from the first group, the previously used recording medium is stored in the first group, whereas when the previously used recording medium is mounted on the media driving means from any one group other than the first group, one recording medium with a lowest utilization frequency among an adjacent group of said one group having a shorter average distance with respect to the media driving means than said one group is moved from said adjacent group to said one group and then the previously used recording medium is stored in said adjacent group, such that a previously used recording medium mounted on the media driving means second group is stored in the first group while a previously used recording medium mounted on the media driving means from the third group is stored in the second group wherein a recording medium with a lowest utilization frequency in it's respective group is moved to the second group and third group, respectively.

2. The system of claim 1, wherein the control means sets a utilization frequency of each recording medium to be a value which decreases as an elapsed time since a last access to said each recording medium increases, and which takes a maximum value when the elapsed time is equal to 0.

3. The system of claim 1, wherein the control means monitors a number of waiting access requests and controls the media exchange operation of the media carrying means such that, when a number of the waiting access requests reaches to a prescribed number, the previously used recording medium is stored into a group among said at least groups from which the previously used recording medium was mounted to the media driving means.

4. A method for controlling a media library system including a storehouse having a plurality of storage cells for storing a plurality of recording media, media driving means for executing data read/write operation with respect to the recording media, and media carrying means for carrying the recording media between the storehouse and the media driving means, the method comprising the steps of:
   driving the media carrying means to execute a media exchange operation to exchange a previously used recording medium mounted on the media driving means with a new recording medium stored in the storehouse; and
   controlling a media exchange operation of the media carrying means such that the storage cells of the storehouse are divided into at least three groups each group having a plurality of storage cells arranged in an order of average distances with respect to the media driving means, including a first group with a shortest average distance with respect to the media driving means among said at least three groups, a second group with a second shortest average distance with respect to the media driving means among said at least three groups which is arranged next to the first group, and a third group with a third shortest average distance with respect to the media driving means among said at least three groups which is arranged next to the second group, and when the previously used recording medium is mounted on the media driving means from the first group, the previously used recording medium is stored in the first group, whereas when the previously used recording medium is mounted on the media driving means from any one group other than the first group, one recording medium with a lowest utilization frequency among an adjacent group of said one group having a shorter average distance with respect to the media driving means than said one group is moved from said adjacent group to said one group and then the previously used recording medium is stored in said adjacent group, such that a previously used recording medium mounted on the media driving means second group is stored in the first group while a previously used recording medium mounted third group is stored in the second group wherein a recording medium with a lowest utilization frequency in it's respective group is moved to the second group and third group, respectively.

5. The method of claim 4, wherein a utilization frequency of each recording medium is set to be a value which decreases as an elapsed time since a last access to said each recording medium increases, and which takes a maximum value when the elapsed time is equal to 0.

6. The method of claim 4, wherein the controlling step monitors a number of waiting access requests and controls the media exchange operation of the media carrying means such that, when a number of the waiting access requests reaches to a prescribed number, the previously used recording medium is stored into a group among said at least three groups from which the previously used recording medium was mounted to the media driving means.

* * * * *